United States Patent
Ashline et al.

(10) Patent No.: US 8,366,439 B2
(45) Date of Patent: Feb. 5, 2013

(54) COMBUSTION OF OIL FLOATING ON WATER

(75) Inventors: Paul M. Ashline, Allentown, PA (US); David Hon Sing Ying, Allentown, PA (US); Tunc Goruney, Bethlehem, PA (US); Xianming Jimmy Li, Orefield, PA (US); Leighta Maureen Johnson, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 267 days.

(21) Appl. No.: 12/853,681

(22) Filed: Aug. 10, 2010

(65) Prior Publication Data

US 2012/0040296 A1    Feb. 16, 2012

(51) Int. Cl.
*F23C 5/00* (2006.01)
*F23C 99/00* (2006.01)
*E02B 15/04* (2006.01)

(52) U.S. Cl. ............................................. 431/8; 431/14

(58) Field of Classification Search ............... 431/8, 14
See application file for complete search history.

(56) References Cited

U.S. PATENT DOCUMENTS

| | | | | |
|---|---|---|---|---|
| 2,487,964 A * | 11/1949 | Cranston | | 169/44 |
| 3,586,469 A | 6/1971 | Molin | | |
| 3,589,844 A * | 6/1971 | Kraemer et al. | | 431/8 |
| 3,601,516 A * | 8/1971 | Somhegyi et al. | | 431/8 |
| 3,606,868 A * | 9/1971 | Voogd | | 123/25 R |
| 3,695,810 A * | 10/1972 | Heagler | | 431/2 |
| 3,749,667 A * | 7/1973 | Lindstrom | | 405/129.3 |
| 4,308,006 A * | 12/1981 | Koblanski | | 431/1 |
| 5,057,004 A * | 10/1991 | McAllister | | 431/202 |
| 5,511,969 A * | 4/1996 | Lopes et al. | | 431/4 |
| 6,296,676 B1 * | 10/2001 | Nohara | | 44/301 |
| 7,037,435 B2 * | 5/2006 | Peisker et al. | | 210/747.5 |
| 2002/0157387 A1 * | 10/2002 | Hirota et al. | | 60/296 |
| 2005/0215441 A1 * | 9/2005 | Mackney et al. | | 508/291 |

FOREIGN PATENT DOCUMENTS

| | | |
|---|---|---|
| DE | 19 00 412 A1 | 8/1969 |
| DE | 3446110 A1 * | 6/1986 |
| FR | 2 818 298 A1 | 6/2002 |
| JP | 10281411 A * | 10/1998 |
| JP | 2000063857 A * | 2/2000 |

OTHER PUBLICATIONS

Babrauskas V., "Estimating Large Pool Fire Burning Rates", Fire Technology, 19 / 4:251-261, Nov. 1983.
Buist I., Coe T., Jensen D., Potter S., Anderson E., Bitting K., Hansen K., "Oil Spill Response Offshore, In Situ Burn Operations Manual", Report No. CG-D-06-03, Final Report submitted to U.S. Coast Guard, Mar. 2003.

(Continued)

*Primary Examiner* — Steven B McAllister
*Assistant Examiner* — Daniel E Namay
(74) *Attorney, Agent, or Firm* — Bryan C. Hoke, Jr.

(57) ABSTRACT

A method for combusting oil from an oil-containing layer floating on water as from an oil spill or well leak. In the method, an oxygen-containing gas is passed through a conduit, the oxygen-containing gas from the conduit is introduced proximate the oil-containing layer floating on water, and oil from the oil-containing layer is combusted with the oxygen-containing gas in the presence of a flame. The oxygen-containing gas is introduced with an oxygen molar flow rate sufficient to decrease the opacity of a smoke plume from the combusting oil.

14 Claims, 6 Drawing Sheets

OTHER PUBLICATIONS

Chatris JM, Quintela, J. Folch J, Planas E, Arnaldos J, Casal J, "Experimetnal Study of burning Rate in Hydrocarbon Pool Fires", Combustion and Flame, 126:1373-1383, 2001.

Dickins DF, Allen AA, "Shell's Beaufort Seal Exploratory Drilling Program: Oil Spill Response in Ice", Aug. 2007.

Evans D, Baum H, McCaffrey B, Mulholland G, Harkleroad M, Manders W, "Combustion of oil on Water", Proceedings of the Ninth Annual Arctic and Marine Oilspill Program Technical Seminar, Edmonton, Alta, pp. 301-336, 1986.

Evans DD, Mulholland GW, Baum HR, Walton WD, McGrattan KB, "In Situ Burning of Oil Spills", Journal of Research of the National Institute of Standards and Technology, vol. 106/1, Jan.-Feb. 2001.

Fay JA, "Model of Spills and Fires from LNG and Oil Tankers", Journal of Hazardous Materials, B96: 171-188, 2003.

Fay JA, "Model of Large Pool Fires", Journal of Hazardous Materials, B136:219-232, 2006.

Hissong DW, "Keys to Modeling LNG Spills on Water", Journal of Hazardous Materials, 140: 465-477, 2003.

Koseki H, "Combustion Properties of Large Liquid Pool Fires", Fire Technology, Aug. 1989.

Koseki H, Mulholland GW, "The Effect of Diameter on the Burning of Crude Oil Pool Fires", Fire Technology, Feb. 1991.

Mudan KS, "Thermal Radiation Hazards from Hydrocarbon Pool Fires" Progress in Energy Combustion Science, 10:59-80, 1984.

Mullin JV, Champ MA, "Introduction/Overview to In Situ Burning of Oil Spills", Spill Science and Technology Bulletin, vol. 8/4:323-330, 2003.

Raj PK, "Spectrum of Fires in an LNG Facility Assessments, Models and Considerations in Risk Evaluations" Final Technical Report submitted to DOT by Technology & Management Systems, Inc. under Contract No. DTRS56-04-T-0005, Dec. 5, 2006.

Raj PK, "A Physical Model and Improved Experimental Data Correlation for Wind Induced Flame Drag in Pool Fires", Fire Technology, 46:579-609, 2010.

Tewarson A, Lee J, Pion RF "The Influence of Oxygen Concentration on Fuel Parameters for Fire Modeling", Proceedings of the 18th Symposium (International) on Combustion, Pittsburgh, PA; The Combustion Institute, pp. 563-570, 1981.

Evans D, Mulholland G, Gross D, Baum H, "Burning, Smoke Production, and Smoke Dispersion from Oil Spill Combustion", Center for Fire Research, U.S. National Bureau of Standards and K. Saito, University of Kentucky, pp. 41-87.

* cited by examiner

COMBUSTION OF OIL FLOATING ON WATER

BACKGROUND

The BP oil spill in the Gulf of Mexico resulted in large areas of crude oil floating on the ocean surface. Some of these areas are close to beaches or natural habitats of animals. Mechanical recovery, chemical treatment, bioremediation, and in-situ burning are amongst the most widely practiced marine oil spill response technologies.

While large scale skimming is one method to control oil pollution, the U.S. Coast Guard has been conducting in-situ burns of the surface oil, primarily due to the advantages associated with this technology such as high oil removal rates, relatively low cost, and simple logistics.

The U.S. Coast Guard issued an operations manual for in-situ burning of oil from oil spills as U.S. Coast Guard Research and Development Center Report No. CG-D-06-03, Oil Spill Response Offshore, In-Situ Burn Operations Manual, Final Report, March 2003 (hereinafter, Coast Guard Manual). The Coast Guard Manual may be referred to for conventional in-situ burning of oil pools floating on water.

The problem of burning oil in the ocean surface is that favorable combustion conditions are rarely achievable, particularly towards the center of the fire where oxygen availability is limited due to lack of air entrainment. As a result, a black smoke plume from the in-situ burn can rise hundreds or even thousands of meters. The Coast Guard Manual described adding chemical smoke inhibitors such as ferrocene. But its use is not approved due to high cost, difficulty of applying, and potential toxicity. While the black smoke may have less environmental impact than the oil slick, the public generally finds the black smoke plume objectionable.

A further problem of the in-situ burn is that a substantial amount of oil is still left unburned after the fire self-extinguishes, that is, after a minimum flame-sustainable oil layer thickness is reached as reported in the Coast Guard Manual.

A method to burn the oil cleanly with substantially less smoke and/or to reduce the residual oil after fire extinction is desired.

Another problem with oil floating on water is the formation of a stable water-in-oil emulsion which will reduce the window of opportunity for in-situ burning. The presence of a critical amount of water in the oil prevents the slick in contact with the ignition source from catching fire as reported in the Coast Guard Manual.

A method to increase the window of opportunity for in-situ burning by providing conditions for burning emulsified oils is desired.

BRIEF SUMMARY

The present invention relates to a method for combusting oil from an oil-containing layer floating on water.

There are several aspects of the method as outlined below.

Aspect #1. A method for combusting oil from an oil-containing layer floating on water, the method comprising:
  passing an oxygen-containing gas through at least one conduit;
  introducing the oxygen-containing gas from the at least one conduit proximate the oil-containing layer floating on water; and
  combusting oil from the oil-containing layer with the oxygen-containing gas in the presence of a flame, wherein the oxygen-containing gas is introduced with an oxygen molar flow rate sufficient to decrease the opacity of a smoke plume from the combusting oil.

Aspect #2. The method of aspect #1 wherein the opacity is decreased below a desired opacity.

Aspect #3. The method of aspect #1 or aspect #2 wherein the step of introducing the oxygen-containing gas from the conduit comprises injecting the oxygen-containing gas through a plurality of nozzles.

Aspect #4. The method of any one of aspects #1 to #3 wherein the step of introducing the oxygen-containing gas from the conduit comprises introducing the oxygen-containing gas into a flame region above the oil-containing layer.

Aspect #5. The method of aspect #4 wherein the oxygen-containing gas is introduced from the at least one conduit from between 0 and 1 meters above the upper surface of the oil-containing layer.

Aspect #6. The method of any one of aspects #1 to #3 wherein the oxygen-containing gas is introduced from the at least one conduit from between 0 and 1 meters below the lower surface of the oil-containing layer.

Aspect #7. The method of any one of aspects #1 to #3 wherein the oxygen-containing gas is introduced from the at least one conduit into the oil-containing layer.

Aspect #8. The method of any one of aspects #1 to #7 further comprising:
  collecting the oil-containing layer with a boom prior to combusting the oil from the oil containing layer.

Aspect #9. The method of any one of aspects #1 to #8 wherein the oxygen concentration of the oxygen-containing gas in the conduit is greater than 25 mole % oxygen when at least a portion of the oil-containing layer is present as an emulsion having a water concentration of 25 weight % water to 40 weight % water.

Aspect #10. The method of any one of aspects #1 to #9 wherein the oxygen concentration of the oxygen-containing gas in the conduit is about 21 mole % oxygen when the oil-containing layer is greater than 3 mm thick.

Aspect #11. The method of any one of aspects #1 to #10 wherein the oxygen concentration of the oxygen-containing gas in the conduit is greater than 25 mole % oxygen when the oil-containing layer is less than 4 mm thick.

Aspect #12. The method of any one of aspects #1 to #8 wherein the oxygen concentration of the oxygen-containing gas in the conduit is greater than 25 mole oxygen when at least portion of the oil-containing layer is greater than 3 mm thick and the amount of oxygen supplied is less than 80% of the stoichiometric oxygen requirement for the oil.

Aspect #13. The method of any one of aspects #1 to #8 further comprising:
  controlling the rate of combusting oil by varying the oxygen molar flow rate introduced by the oxygen-containing gas proximate the oil-containing layer.

Aspect #14. The method of aspect #13 wherein the step of controlling the rate of combusting oil comprises decreasing the oxygen molar flow rate in order to decrease the rate of combusting oil.

Aspect #15. The method of aspect #13 wherein the step of controlling the rate of combusting oil comprises increasing the oxygen molar flow rate in order to increase the rate of combusting oil.

Aspect #16. The method of aspect #1 further comprising:
  passing a combustible mixture of a gaseous fuel and oxygen through a second conduit;
  introducing the mixture from the second conduit proximate the oil-containing layer floating on water; and igniting the combustible mixture with an ignition source thereby initiating combustion of the oil from the oil-containing layer.

Aspect #17. The method of aspect #1 further comprising:

passing one or more combustible mixtures comprising gaseous fuel and oxygen through two or more pilot flame conduits;

introducing the combustible mixture from the two or more pilot flame conduits proximate the oil-containing layer floating on water; and igniting the combustible mixture with an ignition source thereby initiating combustion of the oil from the oil-containing layer.

Aspect #18. The method of aspect #1 further comprising:

passing an oxygen-lean gas through the at least one conduit and/or another conduit; and introducing the oxygen-lean gas from the conduit or the other conduit proximate the oil-containing layer thereby quenching combustion of the oil from the oil-containing layer.

DETAILED DESCRIPTION

Figure 1:
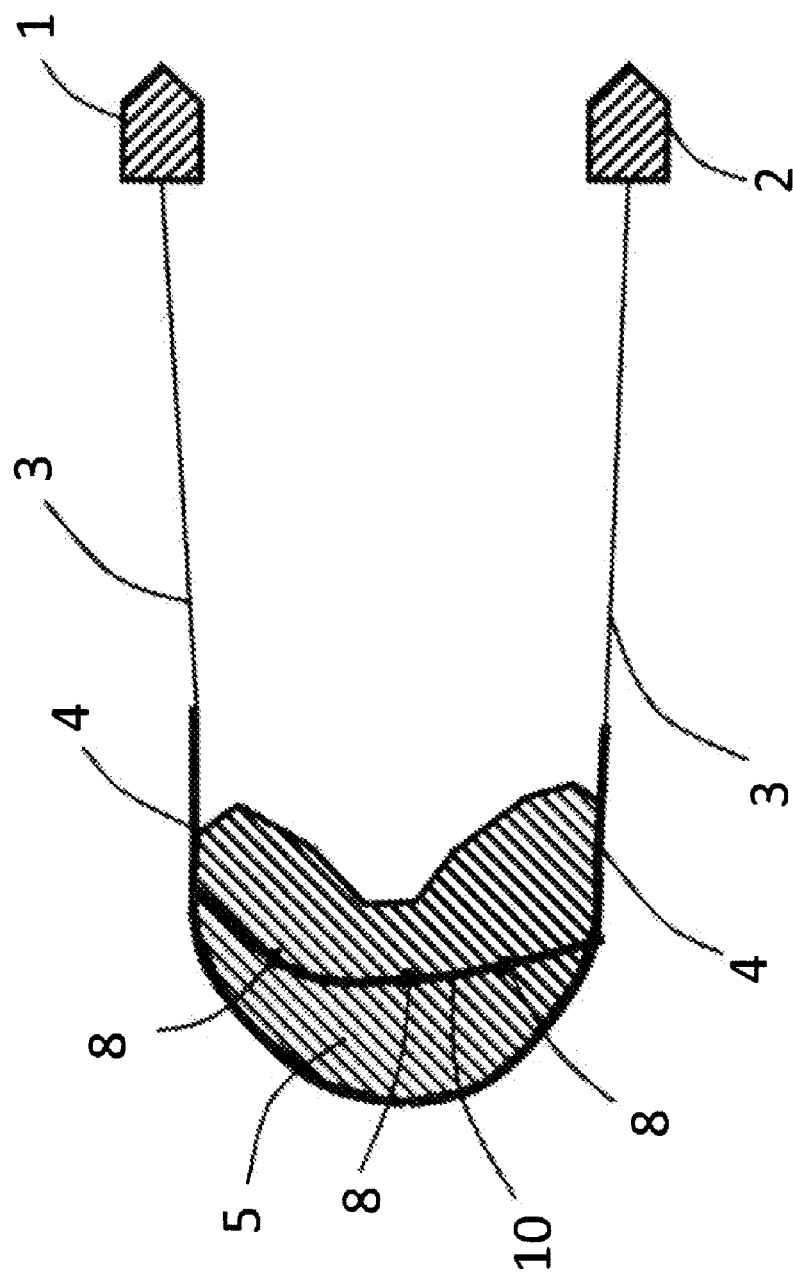
FIG. 1 is a schematic of two towing vessels pulling boom and a configuration of conduit for supplying an oxygen-containing gas.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The phrase "at least a portion" means "a portion or all."

The present invention relates to a method for combusting oil from an oil-containing layer floating on water. Aspects of the method may also be useful for burning oil on land.

As used herein, water includes ocean water, sea water, lake water, river water, and the like.

The oil may be refined oil, unrefined crude oil, or any hydrocarbon-based flammable or combustible mixture in substantially liquid phase. The oil may be oil that has leaked from a vessel or pipeline. The oil may be oil that has leaked from a well.

The oil-containing layer may contain substantially only oil. The oil-containing layer may be an emulsion containing oil and water. At least a portion of the oil-containing layer floats on the water.

The method comprises passing an oxygen-containing gas through at least one conduit.

An oxygen-containing gas is a gas containing oxygen, for example air, oxygen-enriched air, and industrial grade oxygen. Air has an oxygen concentration of about 21 mole % oxygen. Oxygen-enriched air has an oxygen concentration greater than air up to about 85 mole % oxygen. Industrial grade oxygen may contain from 85 mole % to essentially 100 mole % oxygen. The oxygen concentration in the oxygen-containing gas may be varied over time.

The oxygen-containing gas may be supplied by an air compressor on board a boat. Oxygen enrichment may be affected by blending industrial oxygen from a storage vessel on board the boat. Industrial grade oxygen may be supplied from a storage vessel on board the boat.

A conduit is any pipe, tube, passageway or the like, through which a fluid may be conveyed. The conduit may be fabricated from any suitable material known in the art. Since the conduit will be exposed to high temperature flames, the conduit may be fabricated from materials such as fire-retardant fabric, metal, or materials used for the construction of the fire-resistant boom.

The method further comprises introducing the oxygen-containing gas from the at least one conduit proximate the oil-containing layer, the oil-containing layer floating on water. The oxygen-containing gas from the conduit may be injected through a plurality of nozzles. The oxygen-containing gas is introduced proximate the oil-containing layer, which means that the oxygen-containing gas may be introduced into the water directly below the oil-containing layer, into the oil-containing layer, and/or into a flame region above the oil-containing layer. As used herein, a flame region is the visible flame region as seen by the human eye.

The oxygen-containing gas may be introduced from the at least one conduit from between 0 and 1 meters above the upper surface of the oil-containing layer.

The oxygen-containing gas may be introduced from the at least one conduit from between 0 and 1 meters below the lower surface of the oil-containing layer.

The oxygen-containing gas may be introduced from the at least one conduit into the oil-containing layer.

The method further comprises combusting oil from the oil-containing layer with the oxygen-containing gas in the presence of a flame. Heat from the flame vaporizes at least a portion of the oil for combustion with the oxygen-containing gas.

The oil will be combusted at a rate of combusting oil or burning rate. The burning rate as expressed in either $kg/m^2/s$ or mm/minute, is available in the literature for various flammable liquids, cf. Babrauskas, V. "Estimating Large Pool Fire Burning Rates," *Fire Technology*, 19/4, p. 251-261, November, 1983.

The oxygen-containing gas is introduced with an oxygen molar flow rate sufficient to decrease the opacity of a smoke plume from the combusting oil. The opacity may be decreased below a desired opacity.

The oxygen molar flow rate is the molar flow rate of oxygen in the oxygen-containing gas. The oxygen molar flow rate is the oxygen mole fraction multiplied by the total molar flow rate of the oxygen-containing gas.

A decrease in opacity may be readily observed by even a casual observer. The decrease in opacity may be determined by EPA Method 9—Visual Determination of the Opacity of Emissions from Stationary Sources. EPA Method 9 is discussed in EPA 340/1-92-004, Visible Emissions Field Manual EPA Methods 9 and 22, Final Report, dated December 1993. While the smoke plume from the combusting oil from the oil-containing layer floating on water may be moving at a slow speed due to the movement of the boom towed by boats, for the purposes of this method, Method 9 is suitable. The opacity may be determined visually by a qualified observer who has been certified according to EPA Method 9.

Prior to and/or during combusting the oil from the oil-containing layer, the method may comprise collecting the oil-containing layer with a boom. The boom is a fire-resistant boom. Collection of the oil-containing layer is described in the Coast Guard Manual. The Coast Guard Manual also discloses fire-resistant boom.

The Coast Guard Manual discloses that the formation of a stable water-in-oil emulsion in a slick will reduce the window of opportunity for an in-situ burn. The presence of a critical amount of water in the oil prevents the slick in contact with the ignition source from catching fire. To help overcome this problem, the oxygen concentration of the oxygen-containing gas in the conduit may be greater than 25 mole % oxygen when the oil-containing layer is present as an emulsion. The oxygen concentration of the oxygen-containing gas may be greater than 50 mole % oxygen when the oil-containing layer is present as an emulsion. The oxygen concentration of the oxygen-containing gas may be greater than 75 mole % oxygen when the oil-containing layer is present as an emulsion. Oxygen enrichment will improve the combustibility of the emulsion. The emulsion may contain from 25 weight % to 40 weight % water. A suitable amount of oxygen enrichment may be determined without undue experimentation.

The Coast Guard Manual discloses that an in-situ oil fire extinguishes naturally when the slick burns down to a thickness that allows enough heat to pass through the slick to the water to cool the surface of the oil below its flash point. This situation reduces the concentration of flammable vapors above the slick to a level that is below combustible limits. The thickness at which an oil fire on water extinguishes is related to the type of oil and initial slick thickness. Rules of thumb are presented in the Coast Guard Manual that indicate that crude oil with an initial slick thickness of up to 20 mm will extinguish at about 1 mm, crude oil with an initial slick thickness of 50 mm will extinguish at about 2 to 3 mm, and distillate fuels of any initial slick thickness will extinguish at about 1 mm. This means that above a slick thickness of 3 mm, the oil should burn with sustained combustion even without oxygen enrichment.

The oxygen concentration of the oxygen-containing gas in the conduit may be about 21 mole % oxygen, i.e. between 20.5 mole % and 21.5 mole % oxygen, when the oil-containing layer is greater than 3 mm thick.

The burn efficiency or oil removal efficiency by in-situ burning has been found to increase by the introduction of an oxygen-containing gas compared to natural entrainment of air, and the oxygen concentration of the oxygen-containing gas.

The oxygen concentration of the oxygen-containing gas in the conduit may be greater than 25 mole % oxygen when at least a portion of the oil-containing layer is less than 4 mm thick or less than 3 mm thick to reduce the amount of residual oil. The oxygen concentration of the oxygen-containing gas in the conduit may be greater than 50 mole % oxygen when at least a portion of the oil-containing layer is less than 4 mm thick or less than 3 mm thick to reduce the amount of residual oil.

The method may further comprise controlling the rate of combusting oil by varying the oxygen molar flow rate introduced by the oxygen-containing gas proximate the oil-containing layer. The molar flow rate of oxygen introduced by the oxygen-containing gas may be varied by varying the volumetric flow rate of the oxygen-containing gas and/or varying the oxygen concentration of the oxygen-containing gas. The rate of combusting oil may be controlled by decreasing the oxygen molar flow rate in order to decrease the rate of combusting oil. The rate of combusting oil may be controlled by increasing the oxygen molar flow rate in order to increase the rate of combusting oil.

The Coast Guard Manual addresses igniters. However, for hard to start fires, for example with emulsions, additional steps may be taken. The method may further comprise passing a combustible mixture of a gaseous fuel and oxygen through a second conduit, introducing the mixture from the second conduit proximate the oil-containing layer floating on water, and igniting the combustible mixture with an ignition source thereby initiating combustion of the oil from the oil-containing layer. The ignition source may be any ignition source known in the art, for example a sparker, heli-torch, flare-type igniter, tin-can igniter, or a pilot flame.

When at least a portion of the oil-containing layer is present as an emulsion having a water concentration of 25 weight % water to 40 weight % water, the method may comprise additional steps to sustain combustion of the oil from the oil-containing layer. The method may further comprise passing one or more combustible mixtures comprising gaseous fuel and oxygen through two or more pilot flame conduits, introducing the combustible mixture from the two or more pilot flame conduits proximate the oil-containing layer floating on water, and igniting the combustible mixture with an ignition source thereby initiating combustion of the oil from the oil-containing layer.

The Coast Guard Manual discloses that there are methods that allow for some control over the burn area and burn rate, but that it will be difficult, if not impossible, to quickly extinguish a large oil fire on the water.

The present method may comprise steps to help quench combustion of the oil on the water. The method may comprise passing an oxygen-lean gas through the at least one conduit and/or another conduit, and introducing the oxygen-lean gas from the conduit or the other conduit proximate the oil-containing layer thereby quenching combustion of the oil from the oil-containing layer.

As used herein, an oxygen-lean gas is a gas containing 0 to 5 mole % oxygen. The oxygen-lean gas may be industrial grade nitrogen. Industrial grade nitrogen may contain from 99 mole % to essentially 100 mole % nitrogen.

FIG. 1 illustrates an apparatus for carrying out the method. FIG. 1 shows a first geometry for the conduit 10 for supplying the oxygen-containing gas proximate the oil-containing layer 5 floating on water. Towing vessels 1 and 2 pull the fire-resistant boom 4 using tow cables 3. The Coast Guard Manual describes various booms that may be used for this purpose. Because of oxygen-containing gas injection intensifies combustion, the flame temperature may be higher. Therefore, booms with higher temperature rating such as those made of metal or with water cooling are preferred. Schematically, tow cables 3 include an oxygen-containing gas supply conduit. However, separate load-bearing cables such as those made of multi-strand steel wires could be used alongside an oxygen-containing gas supply conduit which itself can be made of fire-resistant flexible pipe, tube or composite floatation and fluid-carrying implements. The boom collects the oil-containing layer 5 prior to and during the combustion of the oil from the oil-containing layer 5. Conduit 10 is attached to the boom 4.

Figure 2:
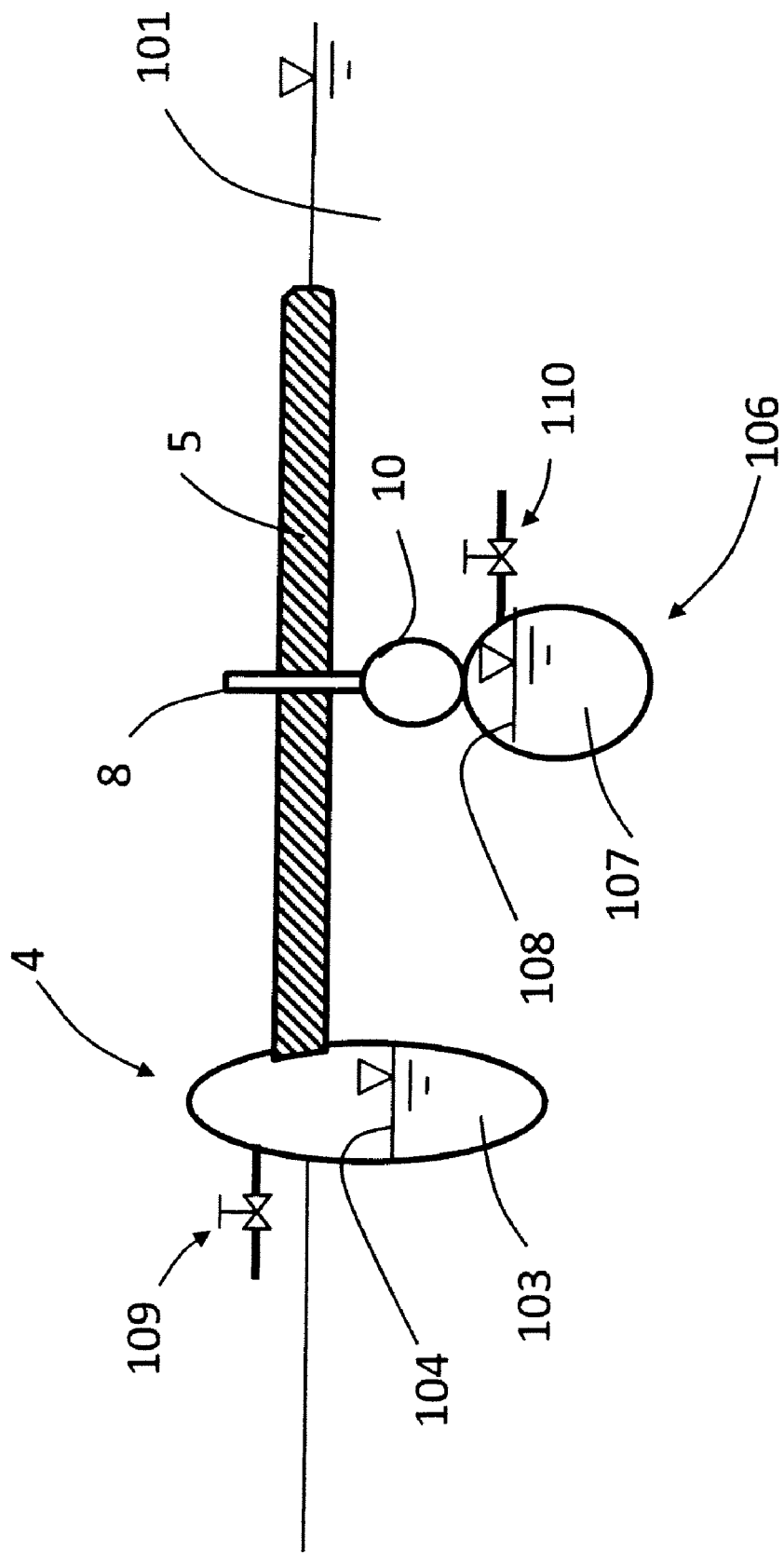
FIG. 2 is a schematic of the oil-containing layer relative to the boom and oxygen-containing gas conduit.

FIG. 2 shows a schematic of the oil-containing layer 5 relative to boom 4 and conduit 10 and illustrates additional details of the configuration. The oil-containing layer 5 collected by the boom 4 is substantially floating on the surface of the water 101. The boom 4 is made to float at a desired depth by controlling the amount of liquid 103 inside the boom. Compressed air or some other gaseous fluid can be added or removed through a controlling device 109, e.g. a valve, to affect the internal liquid level 104. Thus, by adjusting the relative amount of liquid vs. gas inside the boom, the buoyancy of the boom may be controlled so that it floats at a desired depth. The conduit 10 for supplying oxygen-containing gas is attached to a similarly constructed floatation device 106 where a control means 110, e.g. a valve, manipulates the internal liquid level 108 to affect the position of the nozzle 8 relative to the top surface of the oil-containing layer 5. The internal liquid 103 in the boom 4 and the liquid 107 in the floatation device 106 may be water, sea water, or some readily available liquid. As described herein, the oxygen-containing gas conduit is a composite floatation/gas conveying system. Other suitable systems, different from the system as described herein, may provide the same function.

Figure 3:
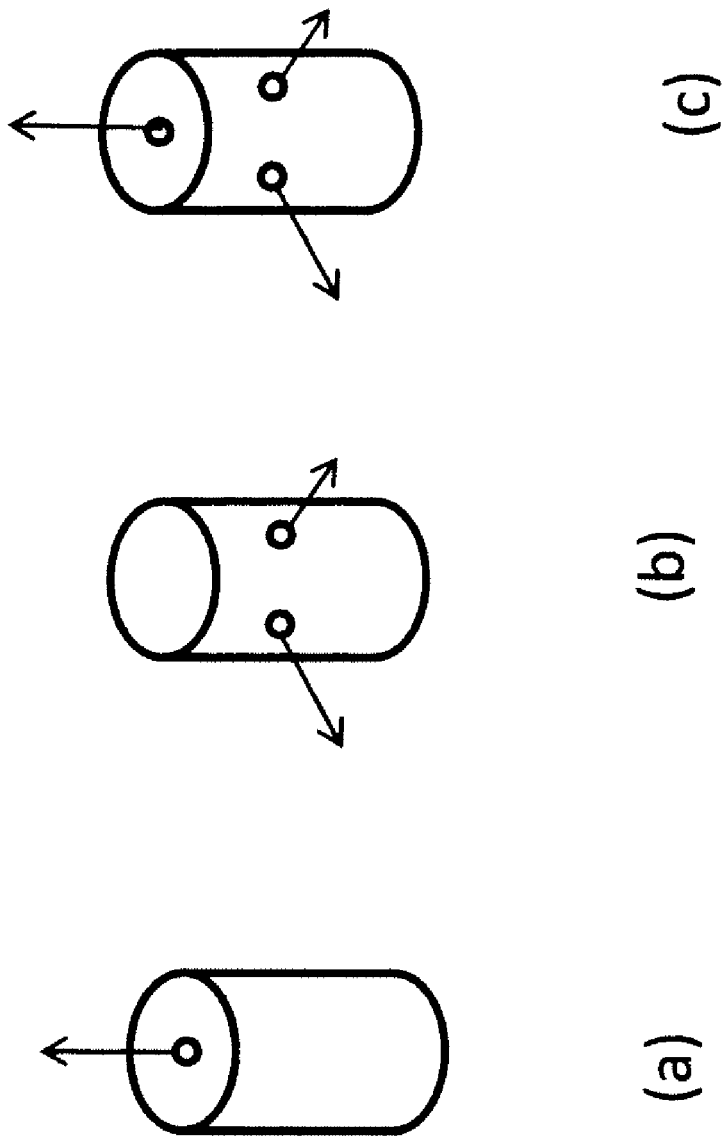
FIG. 3 shows some configurations of oxygen-containing gas injection nozzles.

Conduit 10 in FIG. 1 is configured with nozzles 8. FIG. 3 illustrates some examples of nozzles. The nozzles may be simple straight nozzles (FIG. 3a), nozzles with openings on the side only (FIG. 3b), and/or nozzles with side openings and end opening(s) (FIG. 3c). The conduit 10 may be configured with the same type nozzles throughout or the nozzles may be varied. The nozzles may have straight openings where the oxygen-containing gas is injected radially outward, or they may have a tangential component to induce a swirling pattern. The side openings may have any angle between the jet axis and the pipe axis. That is, the oxygen-containing gas may be injected at 90-degrees to the pipe axis, or any angle more or less than 90-degrees. Other suitable nozzle designs, different from those explicitly disclosed herein, may provide the same function and may be selected without undue experimentation. The number of nozzles and the spacing between the nozzles depend on the diameter of the oil layer, the available pressure of the oxygen-containing gas, the practical limit of equipment size. An example is presented below to illustrate the considerations of sizing such equipment.

Towing vessels 1 and 2 have an air compressor on board to supply the oxygen-containing gas to the conduit 10. The air compressor may be a gasoline-powered air compressor. The compressor may be powered by any power source on the boat, either as part of the boat engine or a separate power source. The compressor should be sized to accommodate the air requirements of a given oil pool diameter to reduce the opacity of the smoke plume. Towing vessels 1 and 2 may also have a suitable storage means for industrial grade oxygen and nitrogen. The storage means may be a dewar, for example. The industrial grade oxygen and nitrogen may be in liquid form or compressed gas form. If liquid of any kind is to be used, it is understood that a suitable vaporization system is also included. In addition, a suitable flow control system must be installed to manage and blend the flows of compressed air, industrial oxygen, and/or industrial nitrogen.

Alternatively, a compact air separation unit such as a vacuum swing adsorption system or a membrane unit may be used onboard the tow boat to supply the industrial oxygen and nitrogen. Cost and space are some of the considerations in deciding which approach is best suited.

Figure 4:
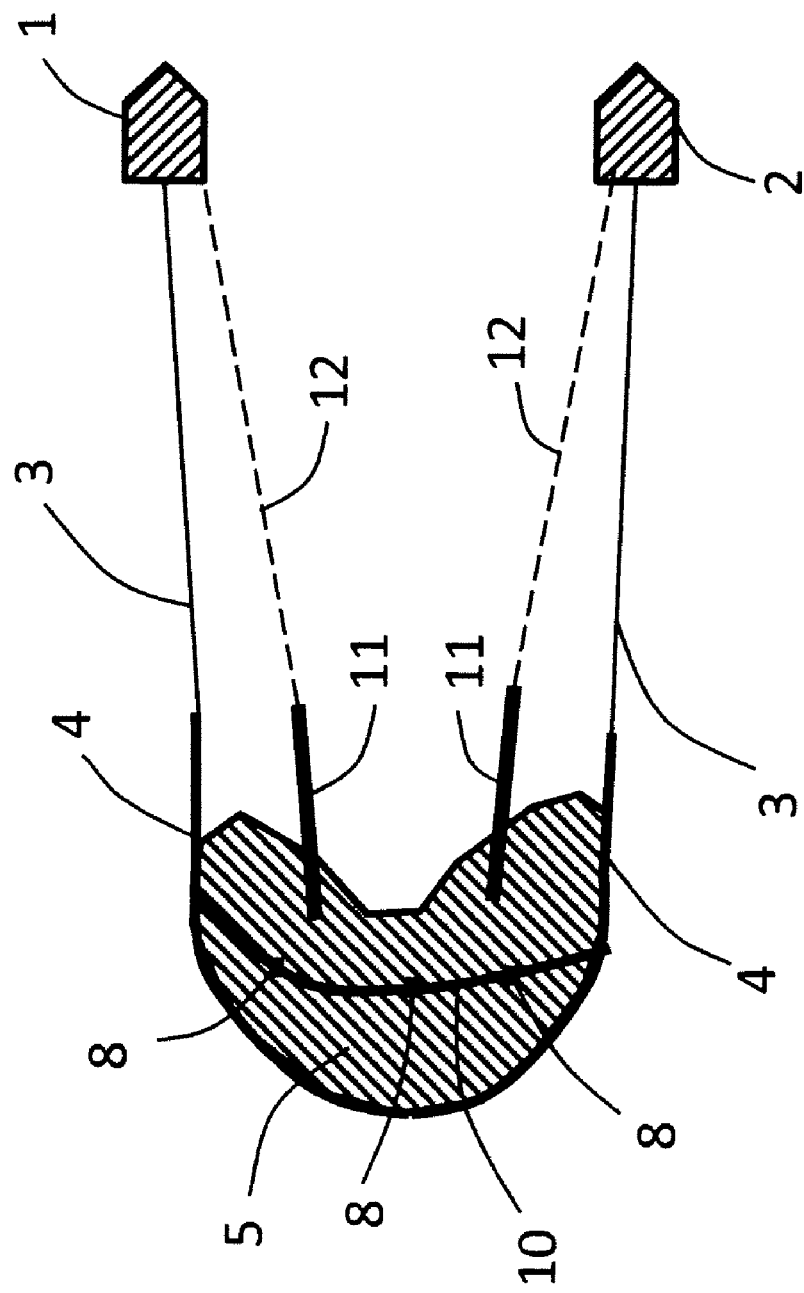
FIG. 4 is a schematic showing two towing vessels pulling boom and a configuration of conduit for supplying an oxygen-containing gas and means for initiating/sustaining oil combustion.

Additional conduits and supply lines may be used to supply combustible mixtures comprising gaseous fuel and oxygen for igniting the oil, as illustrated in FIG. 4. Multiple pilot flames may be particularly useful for combusting oil emulsions. In FIG. 4, the combustible gas mixture is supplied to pilot flame conduits 11 and placed proximate the oil-containing layer 5. The pilot flame conduits may have one or more nozzles for producing pilot flames. Each of the nozzles may have a spark igniter. The position of the pilot flame conduits may be controlled by the two lines 12.

Figure 5:
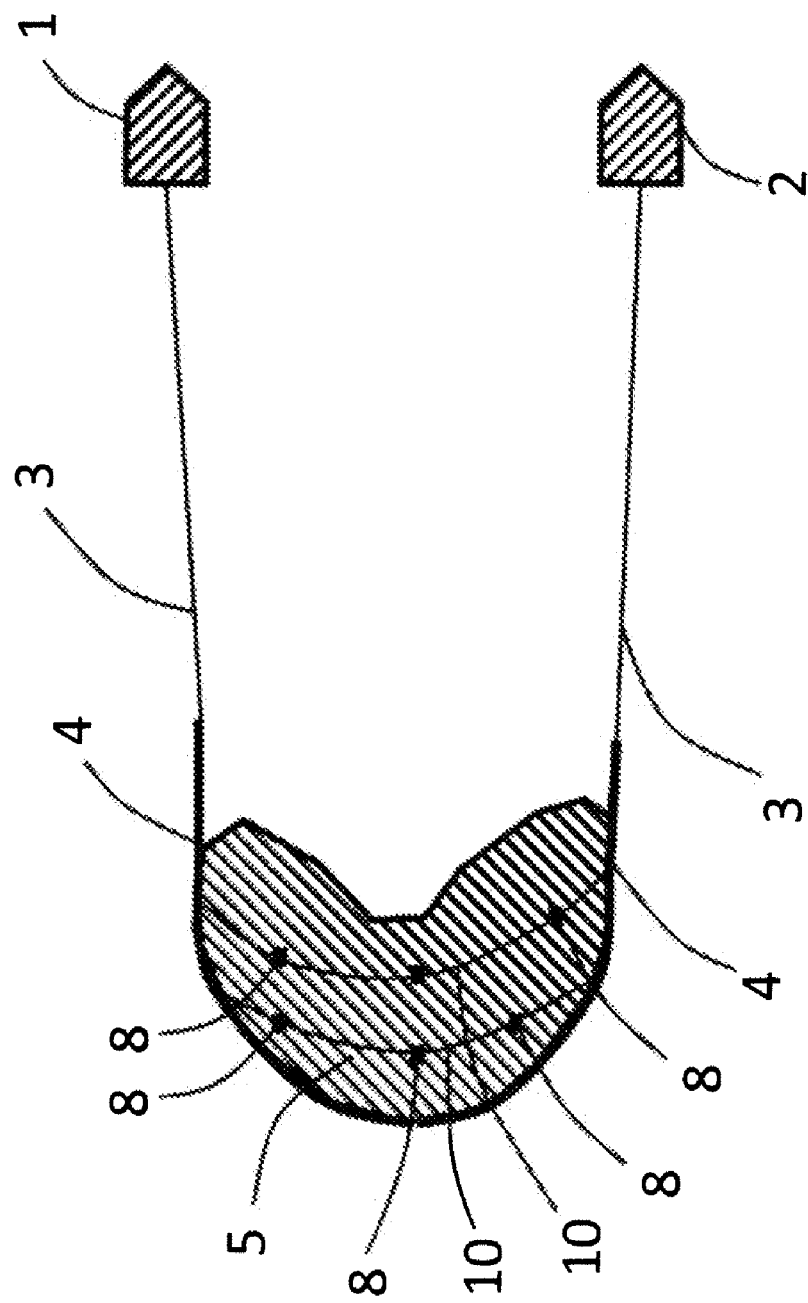
FIG. 5 is a schematic showing two towing vessels pulling boom and another configuration of conduit for supplying an oxygen-containing gas.

FIG. 5 is similar to FIG. 1 and illustrates an alternative geometry showing two conduits 10 for supplying the oxygen containing gas. Like reference numbers refer to like elements in FIG. 1 and FIG. 5.

Figure 6:
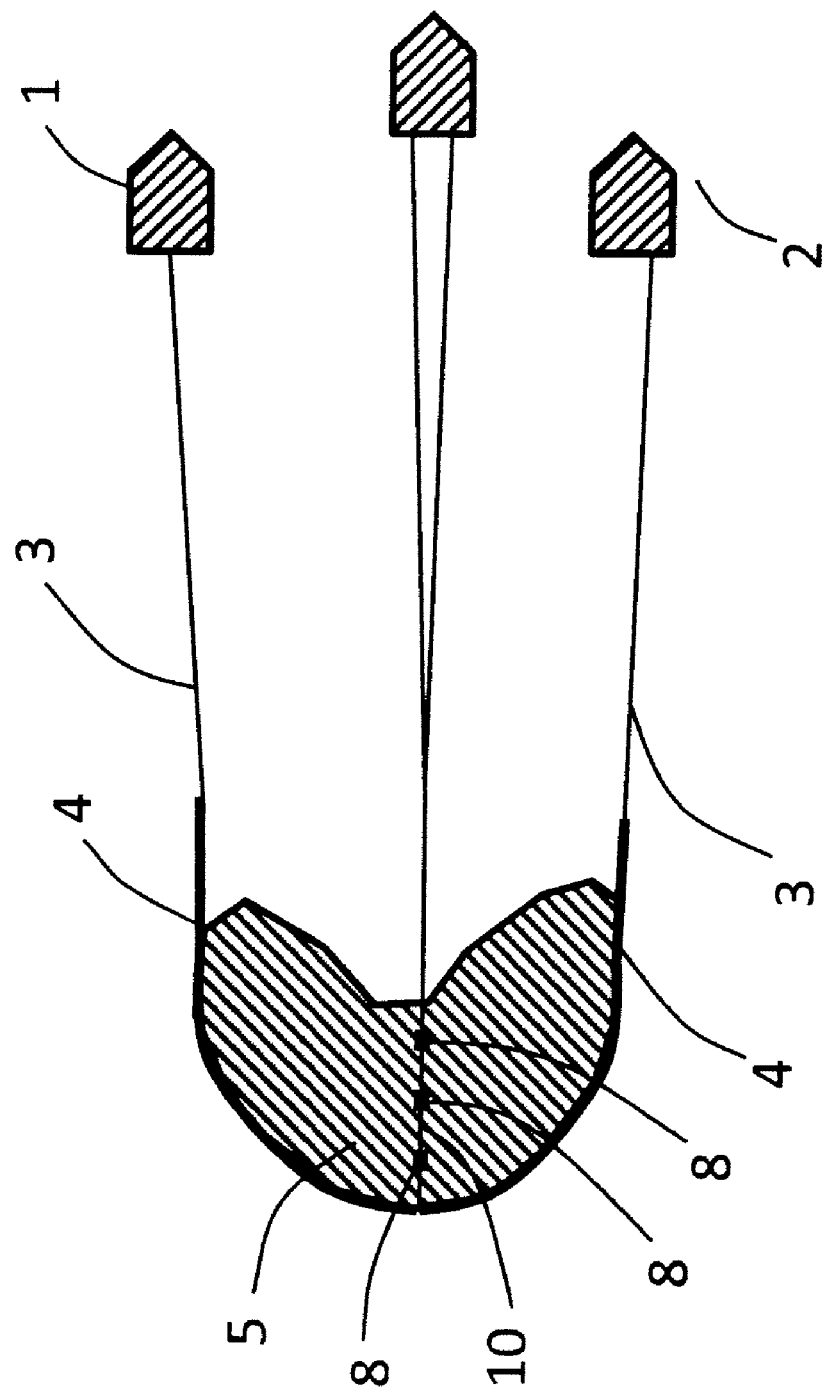
FIG. 6 is a schematic showing two towing vessels pulling boom and another towing vessel pulling the conduit for supplying oxygen-containing gas.

FIG. 6 is similar to FIG. 1 and FIG. 5 and illustrates yet another alternative geometry showing conduit 10 for supplying the oxygen containing gas. Like reference numbers refer to like elements in FIG. 1, FIG. 5, and FIG. 6. In FIG. 6, a third towing vessel is used to tow the conduit 10.

The method is not limited to the towing vessel, tow line, boom, or conduit configurations shown herein. Those skilled in the art can readily determine suitable device configurations suitable for carrying out the method.

EXAMPLES

Laboratory scale experiments were conducted. Experiments were conducted using a 10 cm diameter container and a 20 cm diameter container. The 10 cm diameter container provides a turbulent flame with convective heat transfer feedback. The 20 cm diameter container provides a turbulent flame which is in the transition region for radiant heat transfer feedback, as in a large pool fire. Number 2 fuel oil was used as the flammable liquid.

Both the 10 cm container and the 20 cm diameter container are 20 cm tall. Approximately 17.5 cm of the container was filled with water, and up to 2.5 cm of No. 2 fuel oil was floated on top of the water. An oxidant injection tube was placed near the center of the container. The tube was capped at the end. Six orifices were drilled on the side of the tube near the cap to inject oxidant substantially horizontally across the oil surface, and one orifice was drilled through the center of the cap to inject oxidant substantially upward as illustrated in FIG. 3c.

For experiments with air or oxygen-enriched air injection and the 10 cm diameter container, the oxidant injection tube ID was 12.6 mm, the OD was 15.9 mm, and the injection tube had six 4.8 mm openings on the side and one 4.8 mm opening on the top. For experiments with industrial oxygen and the 10 diameter container, the oxidant injection ID was 6.2 mm, the OD was 9.5 mm and the injection tube had six 2.4 mm openings on the side and one 2.4 mm opening on the top.

For experiments with air or oxygen-enriched air injection and the 20 cm diameter container, the oxidant injection tube ID was 25.7 mm, the OD was 31.8 mm and the injection tube had six 9.7 mm openings on the side and one 9.7 mm opening on the top. For experiments with industrial oxygen and the 20 cm diameter container, the oxidant injection ID was 12.6 mm, the OD was 15.9 mm, and the injection tube had six 4.8 mm openings on the side and one 4.8 mm opening on the top. The oxidant injection tube and orifices were sized to accommodate the increased flow requirements.

Table 1 shows results from a subset of tests where the effect of oxygen concentration in the oxygen-containing gas on the amount of oil residue and relative burning rate was evaluated.

The tests in Table 1 were conducted in the 10 cm diameter test apparatus, but similar observations were made for smoke generation with the 20 cm diameter apparatus. The tests were conducted by igniting the oil using a propane pilot flame while no oxygen-containing gas was being injected. Once a self-sustaining oil flame was achieved, the propane pilot was removed and oxygen-containing gas was introduced (if applicable).

The oil pool fire was allowed to burn until it naturally extinguished. The time to flame extinction was recorded and the extent of the oil residue was noted. The time to flame extinction and the amount of oil charged were used to calculate the relative burn rate.

When no oxygen-containing gas was injected, there was visible black smoke. After the fire self-extinguished, a continuous layer of oil residue was visible on the water surface. If compressed air was injected, no visible smoke was observed, and the oil residue was much thinner, approximately half of the previous case. Finally, if a 50:50 $N_2/O_2$ mix (by moles) was injected, no smoke was visible, and only isolated spots ("islands") of oil was left after the flame went out on its own.

TABLE 1

Oil residue from pool fire tests using different oxidants.

| Test No. | Injected Gas | Smoke | Relative Burning Rate | Oil Residue Visual Observation |
|---|---|---|---|---|
| 85 | None | Yes | 1.0 | Thick continuous layer |
| 90 | Air | No | 1.5 | Thin continuous layer |
| 91 | 50/50 $N_2/O_2$ mix | No | 3.0 | "Islands" of oil |

The experiments showed that a substantial amount of smoke is formed when the pool fire is allowed to burn with only natural entrainment of air.

The experiments showed that introducing air, even if less than the stoichiometric amount, can essentially eliminate the smoke plume. Introducing air also increased the burning rate.

The experiments showed that introducing oxygen-enriched air (50 mole % oxygen) can burn the oil with no visible smoke. The residual fuel left after the burn was about half of the amount of residual fuel when the oil was burned with entrained air alone.

The experiments showed that when the amount of oxygen supplied through the oxidant injection tube is less than the stoichiometric requirement, the opacity is significantly reduced compared to no oxidant injection. For oxidant air (21 mole % oxygen) supplied at 50% of the stoichiometric requirement, some gray smoke was observed. For oxygen-enriched oxidant (28 mole % oxygen) supplied at about 60% of the stoichiometric requirement, no visible smoke was observed.

The experiments showed that introducing essentially pure oxygen causes an extremely fast combustion rate with a very intense flame. Some visible black smoke was formed when a substoichiometric amount of oxygen was added, which may be due to the high temperature intense flame vaporizing too much fuel for the available oxidant. The opacity of the plume from the essentially pure oxygen experiments was less than experiments without oxidant injection. It may be possible to eliminate visible smoke using industrial oxygen as the oxidant with the proper design and arrangement of oxidant nozzles.

As a safety measure, the ability to inject nitrogen through the nozzle was provided. The flame was readily extinguished by introducing nitrogen through the nozzle. The following example illustrates a methodology for sizing equipment. For a given diameter of oil pool and thickness of the oil layer, the amount of oil can be estimated. Combining this information with oil properties such as the amount of carbon, hydrogen, oxygen, etc., one of ordinary skill can calculate the amount of oxygen required for complete combustion of the oil pool. The oxygen requirement is known in combustion science as the stoichiometric oxygen requirement. Since the oil burning rate can be estimated based on pool diameter, cf. Babrauskas (1983), the total burning time can be estimated. Thus, an average rate of oxygen consumption can be estimated assuming the burning rate is constant. Of course, such estimates are only approximations because the burning rate may not be a constant, and that the oil properties may not be known exactly.

The approximate oxygen requirement for a circular oil pool 20 meters in diameter and 5 cm thick may be calculated. The stoichiometric oxygen requirement for combustion is estimated to be 104,000 $Nm^3/hr$, and the estimated total burning time is 17.4 minutes without injecting an oxygen-containing gas.

If half of the stoichiometric oxygen is supplied by injecting an oxygen-containing gas and the oxygen-containing gas is compressed air, the burning time is shortened to 11.6 minutes and the compressed air flow rate is 248,000 $Nm^3/hr$.

If half of the stoichiometric oxygen is supplied by injecting an oxygen-containing gas as above but the oxygen-containing gas has an oxygen mole fraction of 50%, the burning time is shortened to 5.8 minutes. The flow rate of the substantially pure industrial oxygen is 38,000 $Nm^3/hr$ and 5.2 metric tonnes of industrial oxygen is required over the burning period. The total flow rate of the oxygen-containing gas is 104,000 $Nm^3/hr$.

The rate of oxygen-containing gas injection and/or the level of oxygen enrichment need not be constant throughout the burning period. To reduce the consumption of industrial grade oxygen, for example, oxygen enrichment may be used only at the beginning and at the end of the burn, to help establish a self-sustaining flame and to reduce the amount of residual oil, respectively. During the rest of the burn period, compressed air can be used as the oxygen-containing gas.

Literature suggested that controlled burn can be carried out for waves up to 1 m high. That means the nozzle velocity head must be at least that much to avoid water backing into the gas piping. Accounting for piping loss and design margin, 1.5 meters of water is used as a compressor pressure head. With a maximum air flow rate of 248,000 $Nm^3/hr$, the compressor power requirement is 1.0 MW or 1350 hp.

The number of nozzles affects mixing of oxygen containing-gas with oil vapor. More nozzles promote mixing but also complicate the design and increase cost. A practical balance may require each nozzle to cover a circular area of approximately 3 m in diameter. For the 20 meter diameter oil pool, approximately 45 nozzles are needed.

The invention claimed is:

1. A method for combusting oil from an oil-containing layer floating on water, the method comprising:
    passing an oxygen-containing gas through at least one conduit;
    introducing the oxygen-containing gas from the at least one conduit proximate the oil-containing layer floating on water; and
    combusting oil from the oil-containing layer with the oxygen-containing gas in the presence of a flame,
    wherein the oxygen-containing gas is introduced with an oxygen molar flow rate sufficient to decrease the opacity of a smoke plume from the combusting oil; and wherein the oxygen concentration of the oxygen-containing gas in the conduit is greater than 25 mole % oxygen when
at least a portion of the oil-containing layer is present as an emulsion having a water concentration of 25 weight % water to 40 weight % water.

2. The method of claim 1 wherein the opacity is decreased below a desired opacity.

3. The method of claim 1 wherein the step of introducing the oxygen-containing gas from the conduit comprises introducing the oxygen-containing gas into a flame region above the oil-containing layer.

4. The method of claim 3 wherein the oxygen-containing gas is introduced from the at least one conduit from between 0 and 1 meters above the upper surface of the oil-containing layer.

5. The method of claim 1 wherein the oxygen-containing gas is introduced from the at least one conduit from between 0 and 1 meters below the lower surface of the oil-containing layer.

6. The method of claim 1 wherein the oxygen-containing gas is introduced from the at least one conduit into the oil-containing layer.

7. The method of claim 1 wherein the oxygen concentration of the oxygen-containing gas in the conduit is about 21 mole % oxygen when the oil-containing layer is greater than 3 mm thick.

8. The method of claim 1 wherein the oxygen concentration of the oxygen-containing gas in the conduit is greater than 25 mole % oxygen when at least a portion of the oil-containing layer is less than 4 mm thick.

9. The method of claim 1 further comprising:
controlling the rate of combusting oil by varying the oxygen molar flow rate introduced by the oxygen-containing gas proximate the oil-containing layer.

10. The method of claim 9 wherein the step of controlling the rate of combusting oil comprises decreasing the oxygen molar flow rate in order to decrease the rate of combusting oil.

11. The method of claim 9 wherein the step of controlling the rate of combusting oil comprises increasing the oxygen molar flow rate in order to increase the rate of combusting oil.

12. The method of claim 1 further comprising:
passing a combustible mixture comprising a gaseous fuel and oxygen through a second conduit;
introducing the combustible mixture from the second conduit proximate the oil-containing layer floating on water; and
igniting the combustible mixture with an ignition source thereby initiating combustion of the oil from the oil-containing layer.

13. The method of claim 1 further comprising:
passing one or more combustible mixtures comprising gaseous fuel and oxygen through two or more pilot flame conduits;
introducing the combustible mixture from the two or more pilot flame conduits proximate the oil-containing layer floating on water; and
igniting the combustible mixture with an ignition source thereby initiating combustion of the oil from the oil-containing layer.

14. The method of claim 1 further comprising:
passing an oxygen-lean gas through the at least one conduit and/or another conduit; and
introducing the oxygen-lean gas from the conduit or the other conduit proximate the oil-containing layer thereby quenching combustion of the oil from the oil-containing layer.

* * * * *